(12) United States Patent
Deshpande et al.

(10) Patent No.: US 11,438,368 B2
(45) Date of Patent: *Sep. 6, 2022

(54) SECURITY RISK EVALUATION ACROSS USER DEVICES

(71) Applicant: McAfee, LLC, San Jose, CA (US)

(72) Inventors: Rahul Deshpande, Santa Clara, CA (US); German Lancioni, Santa Clara, CA (US); Celeste Fralick, Santa Clara, CA (US)

(73) Assignee: MCAFEE, LLC, San Jose, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/025,848

(22) Filed: Sep. 18, 2020

(65) Prior Publication Data

US 2021/0006586 A1 Jan. 7, 2021

Related U.S. Application Data

(63) Continuation of application No. 15/912,440, filed on Mar. 5, 2018, now Pat. No. 10,785,251.

(Continued)

(51) Int. Cl.
*H04L 9/40* (2022.01)
*G06F 21/44* (2013.01)
(Continued)

(52) U.S. Cl.
CPC .......... *H04L 63/1433* (2013.01); *G06F 21/31* (2013.01); *G06F 21/44* (2013.01);
(Continued)

(58) Field of Classification Search
CPC ............ G06F 21/31; G06F 21/44–445; G06F 21/552; G06F 21/577; G06F 2221/033;
(Continued)

(56) References Cited

U.S. PATENT DOCUMENTS

| | | | |
|---|---|---|---|
| 2009/0199264 A1* | 8/2009 | Lang | G06F 21/31 726/1 |
| 2014/0173738 A1* | 6/2014 | Condry | G06F 21/577 726/25 |

(Continued)

FOREIGN PATENT DOCUMENTS

WO 2018169713 9/2018

OTHER PUBLICATIONS

International Searching Authority, "Search Report and Written Opinion," issued in connection with International Patent Application No. PCT/US2018/020976, dated Jun. 15, 2018, 11 pages.

(Continued)

*Primary Examiner* — Kevin Bechtel

(74) *Attorney, Agent, or Firm* — Hanley, Flight & Zimmerman, LLC

(57) ABSTRACT

Security risk evaluation across user devices is disclosed herein. An example method includes registering one or more devices associated with a first user with the computer system, determining respective security sub-scores for each item of the one or more devices, computing an overall security score for the first user based, at least in part, on an aggregation of the security sub-scores, and creating a user profile based on the overall security score, the user profile to enable the at least one of the one or more devices to exchange data with an external device when the overall security score meets a security score threshold, the user profile to prevent the at least one of the one or more devices (Continued)

from exchanging data with the external device when the overall security score does not meet the security score threshold.

20 Claims, 8 Drawing Sheets

Related U.S. Application Data

(60) Provisional application No. 62/470,714, filed on Mar. 13, 2017.

(51) Int. Cl.
    *G06F 21/55* (2013.01)
    *G06F 21/31* (2013.01)
    *G06F 21/57* (2013.01)

(52) U.S. Cl.
    CPC .......... *G06F 21/552* (2013.01); *G06F 21/577* (2013.01); *H04L 63/1441* (2013.01); *G06F 2221/033* (2013.01); *G06F 2221/034* (2013.01)

(58) Field of Classification Search
    CPC .......... G06F 2221/034; G06Q 10/0635; H04L 63/10; H04L 63/102; H04L 63/14; H04L 63/1433; H04L 63/1441

See application file for complete search history.

(56) References Cited

U.S. PATENT DOCUMENTS

| | | |
|---|---|---|
| 2016/0205127 A1 | 7/2016 | Roehl et al. |
| 2017/0345003 A1* | 11/2017 | Spears ................... G06F 21/42 |
| 2017/0346824 A1 | 11/2017 | Mahabir et al. |

OTHER PUBLICATIONS

Patent Copperation Treaty, "International Preliminary Report on Patentability," issued in connection with International Application No. PCT/US2018/020976, dated Sep. 17, 2019, 1 page.

Patent Cooperation Treaty, "Written Opinion of the International Searching Authority," issued in connection with International Application No. PCT/US2018/020976, dated Sep. 17, 2019, 6 pages.

European Patent Office, "Communication pursuant to Article 94(3) EPC," issued in connection with European Patent Application No. 18712368.2, dated Aug. 6, 2020, 7 pages.

European Patent Office, "Intention to Grant," issued in connection with European Patent Application No. 18712368.2, dated Jul. 1, 2021, 7 pages.

\* cited by examiner

| AREA OF CHART | PROBABILITY | CHART DESIGNATION | ZONE |
|---|---|---|---|
| ABOVE OUTER THIRD | .00135 | ABOVE 3σ | |
| OUTER THIRD | .02135 | ABOVE 2σ | ZONE A |
| MIDDLE THIRD | .1360 | ABOVE 1σ | ZONE B |
| INNER THIRD | .3413 | ABOVE CENTERLINE, X-BAR | ZONE C |
| INNER THIRD | .3413 | BELOW CENTERLINE, X-BAR | |
| MIDDLE THIRD | .1360 | BELOW 1σ | ZONE B |
| OUTER THIRD | .02135 | BELOW 2σ | ZONE A |
| BELOW OUTER THIRD | .00135 | BELOW 3σ | |

700

| POINT LOCATION THAT VIOLATES STATISTICAL THRESHOLDS | PROBABILITY OF THE POINT OCCURRING IN THIS ZONE |
|---|---|
| SINGLE POINT OUTSIDE OF THE 3 SIGMA LIMIT | .0013 |
| 2 OUT OF 3 SUCCESSIVE POINTS FALL IN ZONE A OR BEYOND | .0015 |
| 4 OUT OF 5 POINTS FALL IN ZONE B OR BEYOND | .0027 |
| 8 IN A ROW FALL IN ZONE C OR BEYOND ON ONE SIDE | .0039 |

| RULE | POINT LOCATION | DETECTION | SECURITY ALERT |
|---|---|---|---|
| RULE 1 | ONE POINT BEYOND ZONE A | DETECTS A SHIFT IN THE MEAN, AN INCREASE IN THE STANDARD DEVIATION, OR A SINGLE ABERRATION IN THE PROCESS. | ALERT USER TO INCREASED SPS AS POSITIVE; ALERT USER TO DECREASED SPS AS NEGATIVE & PRESCRIBE SOLUTIONS. |
| RULE 2 | NINE POINTS IN A ROW IN A SINGLE (UPPER OR LOWER) SIDE OF ZONE C OR BEYOND | DETECTS A SHIFT IN THE PROCESS MEAN. | ALERT USER TO INCREASE SPS WITH ADDITIONAL SECURITY FEATURES |
| RULE 3 | SIX POINTS IN A ROW STEADILY INCREASING OR DECREASING | DETECTS A TREND OR DRIFT IN THE PROCESS MEAN. SMALL TRENDS WILL BE SIGNALED BY THIS TEST BEFORE TEST 1. | ALERT USER TO INCREASING SPS AS POSITIVE; ALERT USER TO DECREASED SPS AS NEGATIVE & PRESCRIBE SOLUTION |
| RULE 4 | FOURTEEN POINTS IN A ROW ALTERNATING UP AND DOWN | DETECTS SYSTEMATIC EFFECTS SUCH AS TWO ALTERNATELY USED MACHINES, VENDORS, OR OPERATORS. | ALERT USER TO ERRATIC BEHAVIOR & PRESCRIBE SOLUTION |
| RULE 5 | TWO OUT OF THREE POINTS IN A ROW IN ZONE A OR BEYOND AND THE POINT ITSELF IS IN ZONE A OR BEYOND. | DETECTS A SHIFT IN THE PROCESS AVERAGE OR INCREASE IN THE STANDARD DEVIATION. ANY TWO OUT OF THREE POINTS PROVIDE A POSITIVE TEST. | ALERT USER TO UNIQUE INCREASE (+SIGMA) OR DECREASE (-SIGMA); IF LATTER, PRESCRIBE SOLUTION & SENSE OF URGENCY & CRITICALITY |
| RULE 6 | FOUR OUT OF FIVE POINTS IN A ROW IN ZONE B OR BEYOND AND THE POINT ITSELF IS IN ZONE B OR BEYOND. | DETECTS A SHIFT IN THE PROCESS MEAN. ANY FOUR OUT OF FIVE POINTS PROVIDE A POSITIVE TEST. | ALERT USER TO UNIQUE INCREASE (+SIGMA) OR DECREASE (-SIGMA); IF LATTER, PRESCRIBE SOLUTION & SENSE OF URGENCY AND IMPORTANCE. |
| RULE 7 | FIFTEEN POINTS IN A ROW IN ZONE C, ABOVE AND BELOW THE CENTER LINE | DETECTS STRATIFICATION OF SUBGROUPS WHEN THE OBSERVATIONS IN A SINGLE SUBGROUP COME FROM VARIOUS SOURCES WITH DIFFERENT MEANS. | ALERT USER TO INCREASE SPS WITH ADDITIONAL SECURITY FEATURES |
| RULE 8 | EIGHT POINTS IN A ROW ON BOTH SIDES OF THE CENTER LINE WITH NONE IN ZONES C | DETECTS STRATIFICATION OF SUBGROUPS WHEN THE OBSERVATIONS IN ONE SUBGROUP COME FROM A SINGLE SOURCE, BUT SUBGROUPS COME FROM DIFFERENT SOURCES WITH DIFFERENT MEANS. | ALERT USER TO ERRATIC BEHAVIOR & PRESCRIBE SOLUTION |

FIG. 8

SECURITY RISK EVALUATION ACROSS USER DEVICES

RELATED APPLICATION

This patent arises from a continuation of U.S. patent application Ser. No. 15/912,440, (Now U.S. Pat. No. 10,785, 251) which was filed on Mar. 5, 2018, which claims the benefit of U.S. Provisional Patent Application No. 62/470, 714, which was filed on Mar. 13, 2017. U.S. patent application Ser. No. 15/912,440 and U.S. Provisional Patent Application No. 62/470,714 are hereby incorporated herein by reference in their entireties. Priority to U.S. patent application Ser. No. 15/912,440 and U.S. Provisional Patent Application No. 62/470,714 is hereby claimed.

TECHNICAL FIELD

Embodiments described herein relate generally to security risk evaluation, and particularly to a high-level risk evaluation score that takes multiple of a user's devices into account when determining the risk evaluation score.

BACKGROUND

Device users today are increasingly using multiple connected devices simultaneously, in order to manage their online lives and increase their productivity. The variety of devices and online activity undertaken by users makes them ever more susceptible to various forms of malware and/or ransomware attacks. This makes it difficult for users to accurately gauge and/or feel confident about their online security and privacy levels. This problem is exacerbated by the fact that there is simply a large amount of information to understand, and this information is often too technical for the typical device end user to be able to understand and/or act on in a meaningful way.

Further complicating matters is the fact that many users may now have connected automobiles, homes, home appliances, smart devices, wearables, etc., which may increase the potential attack avenues for malicious actors and/or overwhelm users with a wide array of security and privacy settings and implications. Interconnections and relationships between such smart connected devices may also further increase and complicate the security implications of the user's multi-device connected world.

Some classes of current security risk evaluation solutions may scan a user's device (e.g., including the social network accounts, banking applications, communication accounts, etc., installed on such devices) and suggest modifying privacy and/or security settings to prevent unwanted information leaks. However, such solutions are often restricted in scope, e.g., by only focusing on smartphones (and ignoring all of a user's other connected devices). Further, a user may own a variety of other connected devices, such as wearables, connected automobiles, connected homes, and smart home automation devices, which may likewise leak private user information, with or without the user's knowledge. In many cases, these non-smartphone platforms remain largely unprotected.

Other classes of current security risk evaluation solutions may attempt to provide a visual representation of all of a user's devices. This approach presents an abundance of information for the user to digest and often does not scale well with increasing numbers and complexity of connected devices. Such solutions also do not address the fact that different devices have different levels of security and privacy risks associated with them, and thus should not necessarily be treated equally in the evaluation of a user's overall security risk profile. Due to these and other factors, users have difficulty getting a holistic idea of their security and privacy risks. Current solutions also have difficulty understanding their users' changing security risks over time and suggesting (or even taking) appropriate security measures for a given user's situation.

Thus, what is needed are systems and methods of providing a single reference point to users owning multiple connected devices (and/or having some online activity) that allows them to evaluate the security and privacy aspects of their various online activities and multi-device ecosystem over time.

BRIEF DESCRIPTION OF DRAWINGS

FIG. 7 shows tables of exemplary SPC thresholds and probabilities, according to one or more embodiments disclosed herein.

FIG. 8 is a table illustrating exemplary SPC rules and the corresponding exemplary security alerts, according to one or more embodiments disclosed herein.

DESCRIPTION OF EMBODIMENTS

Figure 1:
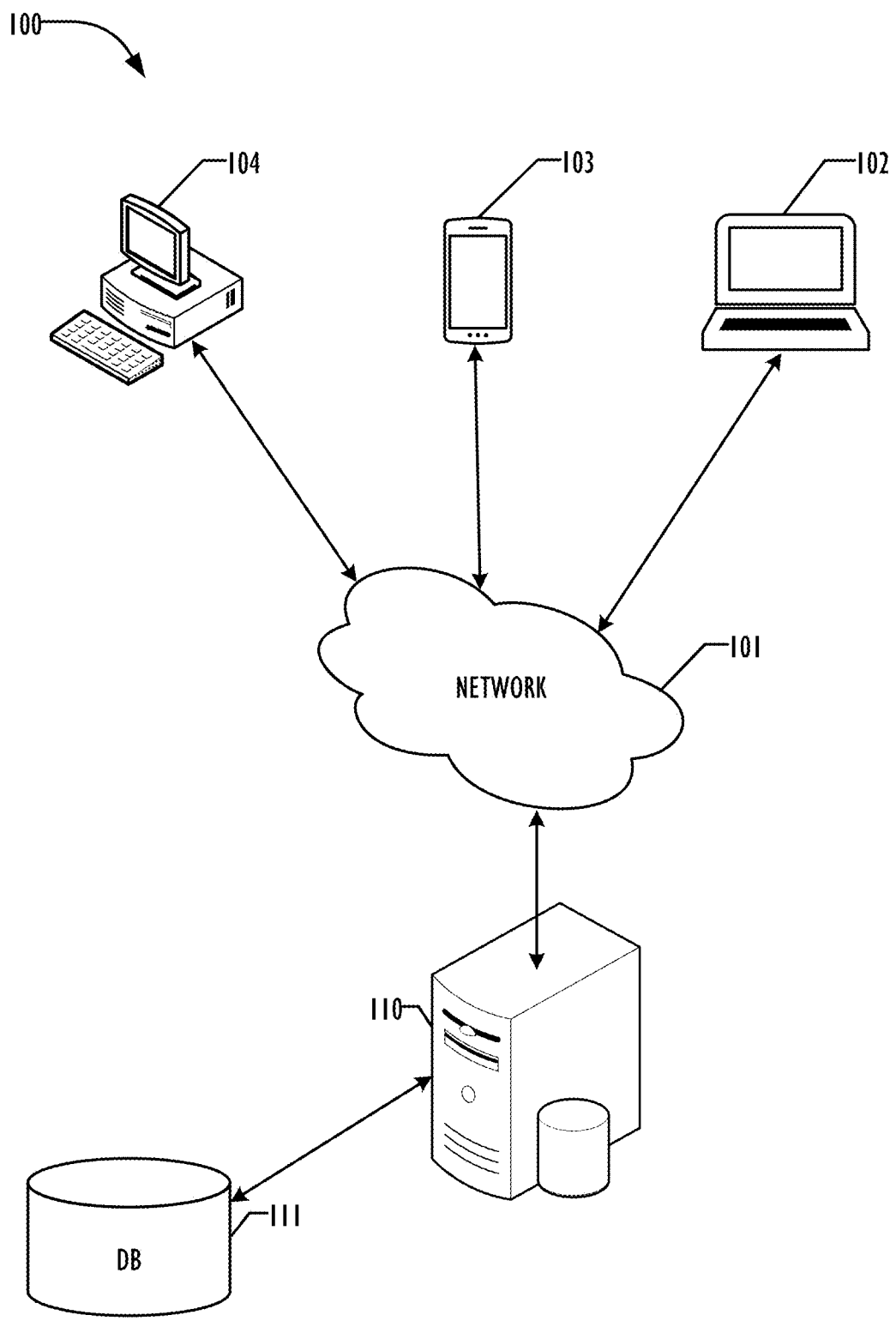
FIG. 1 is a pictorial diagram of a user's multi-device connected ecosystem, according to one or more embodiments disclosed herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been selected principally for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

As used herein, the term "a computer system" can refer to a single computer or a plurality of computers working together to perform the function described as being performed on or by a computer system.

As used herein, the term "processor" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processor to perform an action may program any or all of the processors to perform the indicated action. Where the processor is one or more multi-core processors, instructions that when executed program the processor to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

The term "or" means any of the alternatives and any combination of the alternatives, including all of the alternatives, unless the alternatives are explicitly indicated as mutually exclusive.

In the absence of a single reference point for evaluating multi-device security risk levels, it may be difficult for users to get a high-level picture of their security and privacy (e.g., risks, implications, status, etc.) across all of their devices. The user's connected devices could comprise, e.g., smartphones, health trackers, smart watches, home automation devices, home security devices, online financial transactions, social network interactions, cars, etc.

According to some embodiments described herein, a Security and Privacy Score (SPS) is disclosed, which is designed to provide users with a single reference point for evaluating multi-device security risk levels. Once calculated, an SPS may be used to identify potential data or online attack risks for a user at any given moment (e.g., by also taking into account the user's historical pattern of activity and device usage). To understand the concept of the SPS better, it may be analogized to the concept of a consumer credit score. A credit score is used to identify the potential lending risk for individuals. Similarly, an SPS may be used to identify potential data or online attack risks for a user at any given moment, taking into account the user's history of activity and data usage patterns.

The solutions presented herein advantageously take all of the connected devices owned by a user into account when providing an overall security score (i.e., the SPS). This allows the system to address the interplay of multiple of a user's devices with each other (and the various security and privacy implications thereof) during the performance of a user's overall, multi-device risk evaluation.

The solutions presented herein further address these and other limitations by providing a high-level or holistic evaluation of a user's overall security risk, while providing the user (or authorized third parties) with a convenient single point of reference to evaluate the security profile of individual users, without needing detailed information on the settings and/or activities of each of the individual connected devices owned by a given user.

Using Statistical Process Control (SPC) techniques, the solutions presented herein may further take a proactive approach to analyzing a user's SPS score as it changes over time in order to provide the user with a more personalized experience, as well as a more detailed level of criticality analysis. Use of SPC may also allow the solutions presented herein to suggest behaviors to potentially improve a user's overall security level, e.g., when the user's SPS score over a given time interval has violated one or more prescribed SPC rules.

FIG. 1 is a pictorial diagram of one example of a user's multi-device connected ecosystem 100, according to one or more embodiments disclosed herein. The database 111 represents any data store (e.g., local or remote to the user's devices) that may be accessed by one or more users using one or more client devices 102-104, by communicating with server 110 over network 101. Network 101 may, e.g., comprise the Internet or any other suitable network. Database 111 may store information related to a user's various security and privacy settings and historical activities. In this embodiment, the client computer 104 may use an application program, such as a web browser, to send or request information across network 101 to server 110. The sent or requested information may include information about the connected device sending the information, information about the applications used or installed on the connected device, and/or information regarding the user's activity patterns on the connected device.

When the information transfer is complete, server 110 may return data corresponding to a Security and Privacy Score (SPS), which was calculated based on the information sent to server 110 or already stored in database 111. The SPS may then be transmitted back across the network 101 to client computer 104 for display to a user using the application. This process of sending security and/or privacy information, generating the score results, generating a response message comprising the score results (and, optionally, further including any security alerts and/or corresponding suggested remedial actions based on the score results), and then returning the scores results to one or more of the user's client devices 102-104 may be repeated any time the user affirmatively communicates over the network 101 to server 110 to request an updated score. Alternately, a score may be generated and sent to a user at some predetermined regular or irregular time interval, or in response to one or more trigger events (e.g., the installation of a new program or bringing online of a new device).

Figure 2:
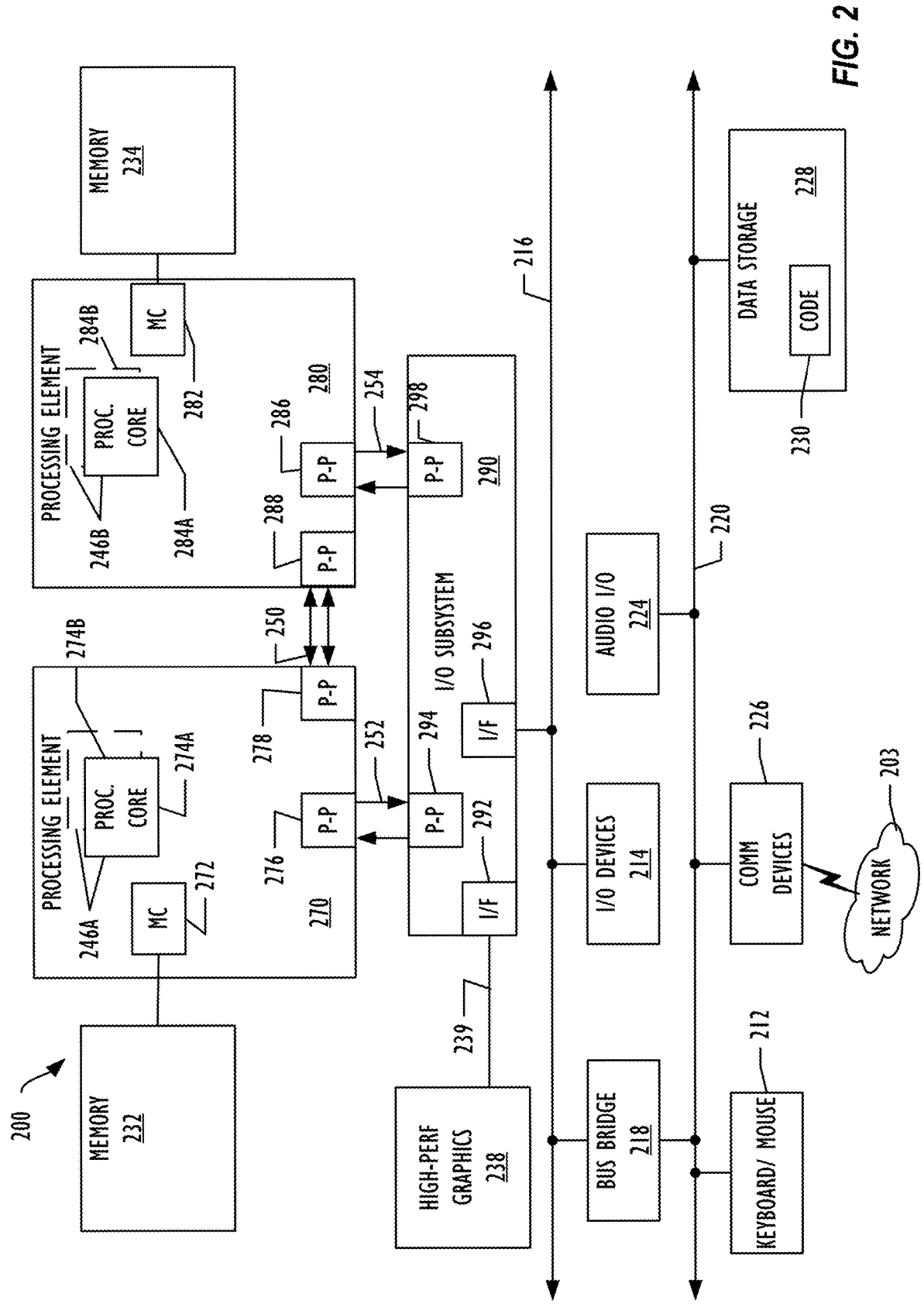
FIGS. 2-3 are block diagrams illustrating a computing device for use with techniques according to two or more embodiments disclosed herein.

Referring now to FIG. 2, a block diagram illustrates a programmable device 200 that may be used for implementing the techniques described herein, in accordance with one embodiment. The programmable device 200 illustrated in FIG. 2 is a multiprocessor programmable device that includes a first processing element 270 and a second processing element 280. While two processing elements 270 and 280 are shown, an embodiment of programmable device 200 may also include only one such processing element.

Programmable device 200 is illustrated as a point-to-point interconnect system, in which the first processing element 270 and second processing element 280 are coupled via a point-to-point interconnect 250. Any or all of the interconnects illustrated in FIG. 2 may be implemented as a multidrop bus rather than point-to-point interconnects.

As illustrated in FIG. 2, each of processing elements 270 and 280 may be multicore processors, including first and second processor cores (i.e., processor cores 274a and 274b and processor cores 284a and 284b). Such cores 274a, 274b, 284a, 284b may be configured to execute instruction code. However, other embodiments may use processing elements that are single core processors as desired. In embodiments with multiple processing elements 270, 280, each processing element may be implemented with different numbers of cores as desired.

Each processing element 270, 280 may include at least one shared cache 246. The shared cache 246a, 246b may store data (e.g., instructions) that are utilized by one or more components of the processing element, such as the cores 274a, 274b and 284a, 284b, respectively. For example, the shared cache may locally cache data stored in a memory 232, 234 for faster access by components of the processing elements 270, 280. In one or more embodiments, the shared cache 246a, 246b may include one or more mid-level caches, such as level 2 (L2), level 3 (L3), level 4 (L4), or other levels of cache, a last level cache (LLC), or combinations thereof.

While FIG. 2 illustrates a programmable device with two processing elements 270, 280 for clarity of the drawing, the scope of the present invention is not so limited, and any number of processing elements may be present. Alternatively, one or more of processing elements 270, 280 may be an element other than a processor, such as an graphics processing unit (GPU), a digital signal processing (DSP) unit, a field programmable gate array, or any other programmable processing element. Processing element 280 may be heterogeneous or asymmetric to processing element 270. There may be a variety of differences between processing elements 270, 280 in terms of a spectrum of metrics of merit including architectural, microarchitectural, thermal, power consumption characteristics, and the like. These differences may effectively manifest themselves as asymmetry and heterogeneity amongst processing elements 270, 280. In some embodiments, the various processing elements 270, 280 may reside in the same die package.

First processing element 270 may further include memory controller logic (MC) 272 and point-to-point (P-P) interconnects 276 and 278. Similarly, second processing element 280 may include a MC 282 and P-P interconnects 286 and 288. As illustrated in FIG. 2, MCs 272 and 282 couple processing elements 270, 280 to respective memories, namely a memory 232 and a memory 234, which may be portions of main memory locally attached to the respective processors. While MC logic 272 and 282 is illustrated as integrated into processing elements 270, 280, in some embodiments the memory controller logic may be discrete logic outside processing elements 270, 280 rather than integrated therein.

Processing element 270 and processing element 280 may be coupled to an I/O subsystem 290 via respective P-P interconnects 276 and 286 through links 252 and 254. As illustrated in FIG. 2, I/O subsystem 290 includes P-P interconnects 294 and 298. Furthermore, I/O subsystem 290 includes an interface 292 to couple I/O subsystem 290 with a high performance graphics engine 238. In one embodiment, a bus (not shown) may be used to couple graphics engine 238 to I/O subsystem 290. Alternately, a point-to-point interconnect 239 may couple these components.

In turn, I/O subsystem 290 may be coupled to a first link 216 via an interface 296. In one embodiment, first link 216 may be a Peripheral Component Interconnect (PCI) bus, or a bus such as a PCI Express bus or another I/O interconnect bus, although the scope of the present invention is not so limited.

As illustrated in FIG. 2, various I/O devices 214, 224 may be coupled to first link 216, along with a bridge 218 that may couple first link 216 to a second link 220. In one embodiment, second link 220 may be a low pin count (LPC) bus. Various devices may be coupled to second link 220 including, for example, a keyboard/mouse 212, communication device(s) 226 (which may in turn be in communication with the computer network 203), and a data storage unit 228 such as a disk drive or other mass storage device which may include code 230, in one embodiment. The code 230 may include instructions for performing embodiments of one or more of the techniques described above. Further, an audio I/O 224 may be coupled to second link 220.

Note that other embodiments are also contemplated. For example, instead of the point-to-point architecture of FIG. 2, a system may implement a multi-drop bus or another such communication topology. Although links 216 and 220 are illustrated as busses in FIG. 2, any desired type of link may be used. In addition, the elements of FIG. 2 may alternatively be partitioned using more or fewer integrated chips than illustrated in FIG. 2.

Figure 3:
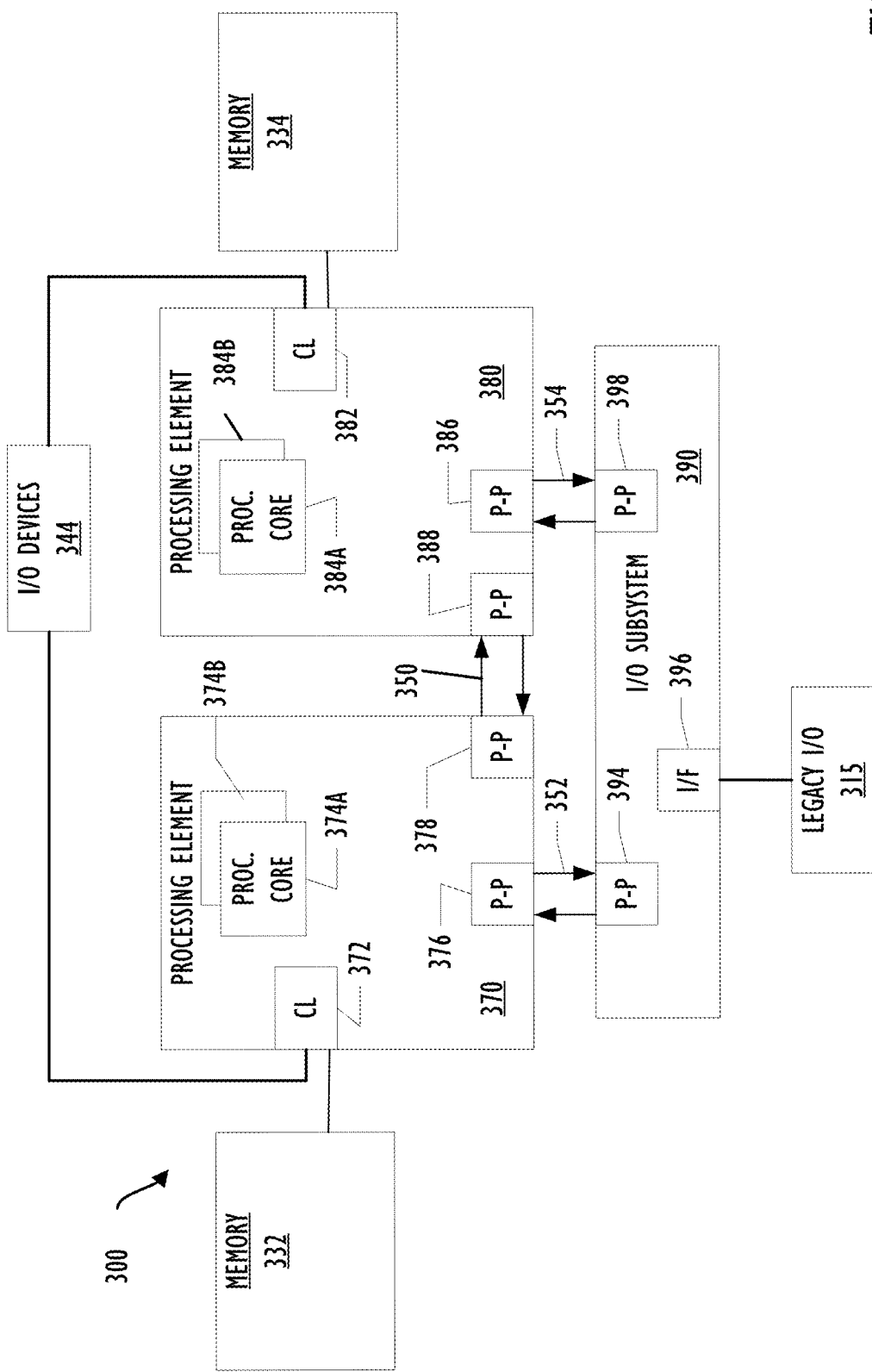

Referring now to FIG. 3, a block diagram illustrates a programmable device 300 according to another embodiment. Certain aspects of FIG. 3 have been omitted from FIG. 3 in order to avoid obscuring other aspects of FIG. 3.

FIG. 3 illustrates that processing elements 370, 380 may include integrated memory and I/O control logic ("CL") 372 and 382, respectively. In some embodiments, the 372, 382 may include memory control logic (MC) such as that described above in connection with FIG. 2. In addition, CL 372, 382 may also include I/O control logic. FIG. 3 illustrates that not only may the memories 332, 334 be coupled to the CL 372, 382, but also that I/O devices 344 may also be coupled to the control logic 372, 382. Legacy I/O devices 315 may be coupled to the I/O subsystem 390 by interface 396. Each processing element 370, 380 may include multiple processor cores, illustrated in FIG. 3 as processor cores 374A, 374B, 384A and 384B. As illustrated in FIG. 3, I/O subsystem 390 includes point-to-point (P-P) interconnects 394 and 398 that connect to P-P interconnects 376 and 386 of the processing elements 370 and 380 with links 352 and 354. Processing elements 370 and 380 may also be interconnected by link 350 and interconnects 378 and 388, respectively.

The programmable devices depicted in FIGS. 2 and 3 are schematic illustrations of embodiments of programmable devices that may be utilized to implement various embodiments discussed herein. Various components of the programmable devices depicted in FIGS. 2 and 3 may be combined in a system-on-a-chip (SoC) architecture.

Figure 4:
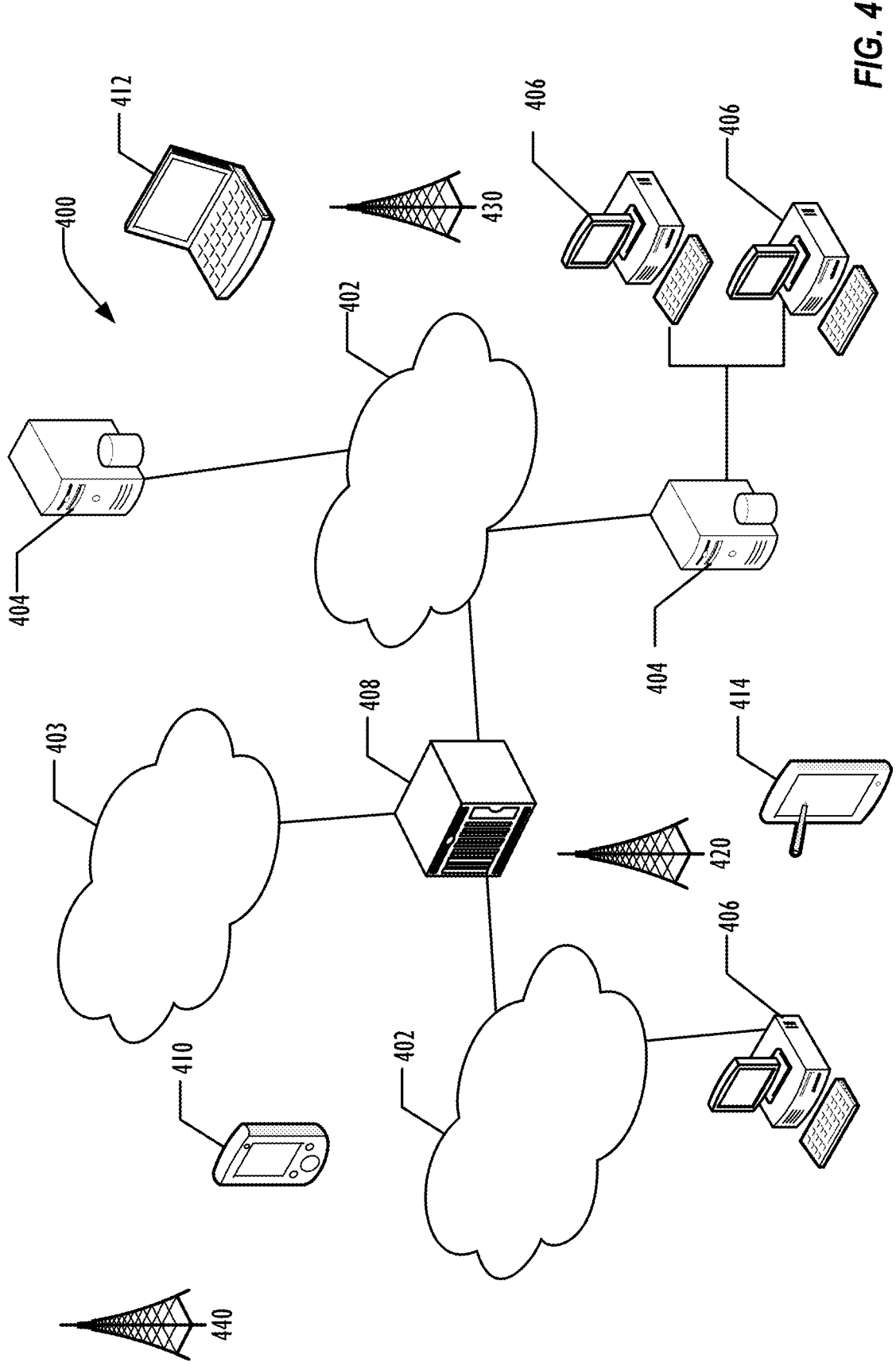
FIG. 4 is a block diagram illustrating a network of programmable devices that may be used as an infrastructure according to one or more embodiments disclosed herein.

Referring now to FIG. 4, an example infrastructure 400, in which the techniques described above may be implemented is illustrated schematically. Infrastructure 400 contains computer networks 402. Computer networks 402 may include many different types of computer networks available today, such as the Internet, a corporate network or a Local Area Network (LAN). Each of these networks can contain wired or wireless programmable devices and operate using any number of network protocols (e.g., TCP/IP). Networks 402 may be connected to gateways and routers (represented by 408), end user computers 406, and computer servers 404. Infrastructure 400 also includes cellular network 403 for use with mobile communication devices. Mobile cellular networks support mobile phones and many other types of mobile devices. Mobile devices in the infrastructure 400 are illustrated as mobile phones 410, laptops 412 and tablets 414. A mobile device, such as mobile phone 410, may interact with one or more mobile provider networks as the mobile device moves, typically interacting with a plurality of mobile network towers 420, 430, and 440 for connecting to the cellular network 403. A mobile device may interact with towers of more than one provider network, as well as with multiple non-cellular devices such as wireless access points and routers 408. In addition, the mobile devices 410, 412 and 414 may interact with non-mobile devices such as computers 404 and 406 for desired services.

Statistical Process Control (SPC)

Statistical Process Control may be defined as the use of valid analytical methods to identify the existence of special causes of variation in a process. The theories behind SPC have been in use in industry since the 1950s, with various improvements having been made over the years, e.g., by identifying process variation, identifying its cause, selecting improvement methods, and removing the causes. Variation naturally occurs in most industrial systems due to common causes, but one key to measurable process improvement is to be able to identify when special causes of variation occur. In this manner, reaction is based on outliers caused by special causes, and the natural variation of the process (e.g., common causes) may be explored 'off-line.' To achieve this SPC, control charts with control limits (e.g., thresholds) may be used to react to the natural variation of the process due to common and special causes. The elegance of SPC is that it may be used to provide all users with a "personalized" trend that can indicate whether the user's system is within its normal range of variation of operational parameters (or not) in a very simplified and easy-to-understand fashion. SPC may also provide users with a better idea of the level of criticality of their current security situation.

Figure 5:
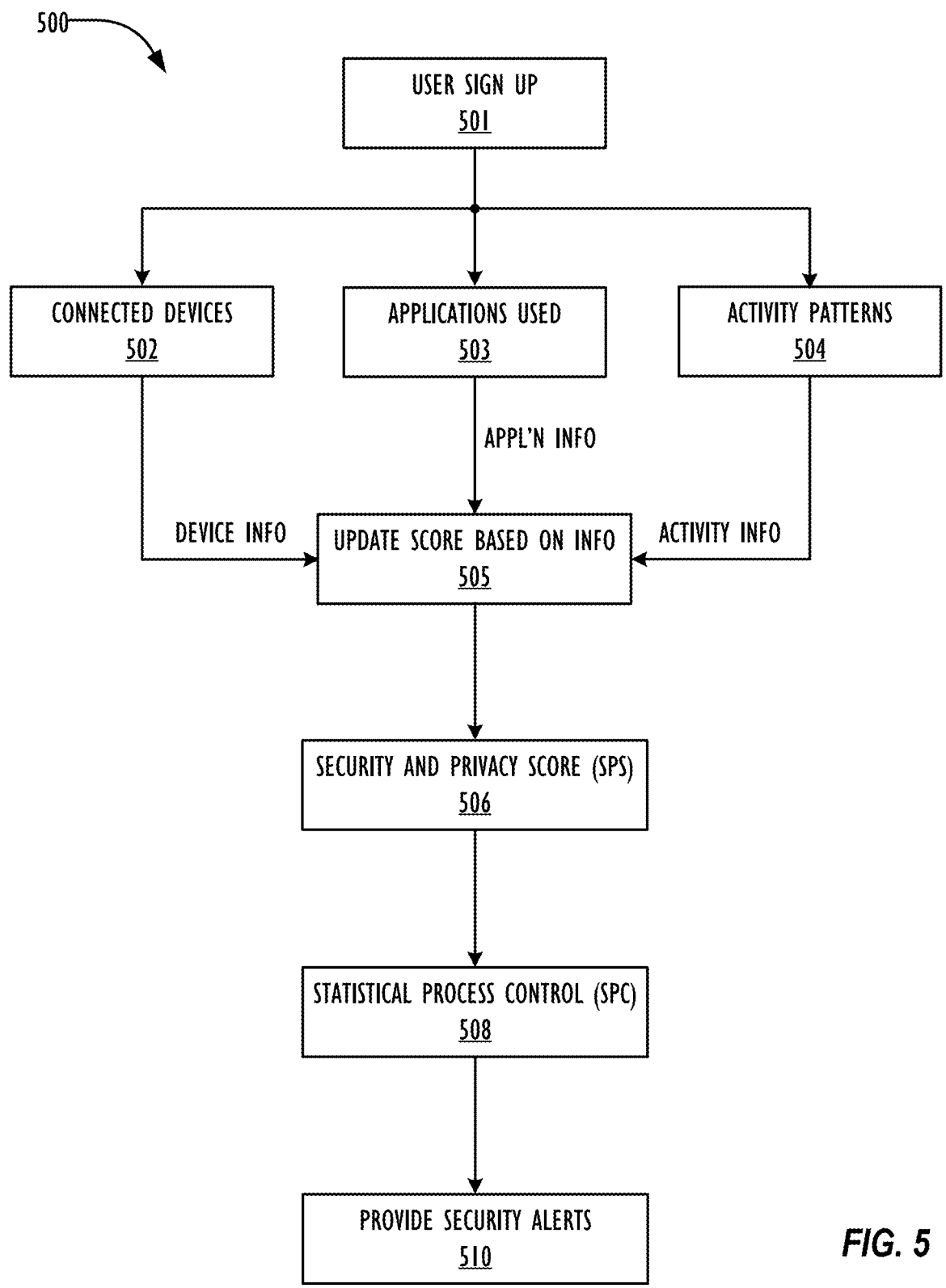
FIG. 5 is a block diagram of a method for computing an improved multi-device security risk evaluation score leveraging Statistical Process Control (SPC), according to one or more embodiments disclosed herein.

Turning now to FIG. 5, a block diagram 500 of a method for computing an improved multi-device security risk evaluation score is illustrated, according to one or more embodiments disclosed herein. First, a user may sign up for the SPS computing services (501). In response to user sign-in, the improved multi-device security risk evaluation system may collect various types of information from the user regarding his or her devices and use thereof. For example, the system may collect information regarding: the number, type, or identity of connected devices owned by the user (502); the number, type, or identity of application programs used by the user (503); or the historical activity patterns of the user, with regard to his or her one or more connected devices and one or more applications, including any security measures already being taken by the user or the particular device (504).

The collected information 502-504 may then be sent to the multi-device security risk evaluation system (e.g., executing on a server, such as server 110 of FIG. 1), so that the score may be updated (505) based on the newly-received user information. For example, in some embodiments, the SPS may cover a range, e.g., from 0-1000, with the user being assigned a base score of 500 at the beginning of the process. This range is illustrative and by way of example only, and other ranges, including ranges with negative values may be used. Based on any one or more of the pieces of information collected, e.g., in blocks 502-504, the user's SPS may be updated either positively or negatively, based, e.g., on the type of the information, the value of the information and/or the severity of the potential risk point for which information is being provided by the user. For example, using a strong password for a particular application may be a (+50) factor, using two-factor authentication for a particular application may be a (+250) factor, whereas not setting an application inactivity logout time may be a (−50) factor towards the user's overall SPS value. After all the desired information is gathered, a final SPS may be calculated and presented to the user (506). The process of determining or updating a user's SPS may be repeated any time that a user acquires a new device, whenever the user changes activity patterns, at some regular (or irregular) time interval, or in response to one or more trigger events (e.g., the installation of a new program or bringing online of a new device).

According to some embodiments, each device in a user's device ecosystem may be assigned a "contribution factor," which defines how much weight each device has in contributing towards the user's final determined SPS value. This contribution factor may represent the security implications of a particular event, property, or setting in question. For example, a device or application event, property, or setting with associated security risks may contribute negatively to the final score. The higher the security risk is, the greater the negative contribution towards the final score may be. Conversely, a device or application event, property, or setting that helps users secure their online activity may contribute positively to the score, with the greater the positive contribution to the user's security, the greater the positive contribution towards the final score. Examples of application events, properties, and/or settings that may contribute positively to a user's final score may include, the installation of an anti-malware solutions, the use of data backup solutions, the use of complex or two-factor password authentication, etc.

The authority that provides the SPS to users (e.g., a service or services executing on a server, such as server 110 of FIG. 1) may maintain a dataset containing many possible applications, events, properties, and settings, as well as their corresponding contribution factors and/or score contributions. In some embodiments, the calculation of the SPS value be done locally, e.g., on one or more of a user's device. If the SPS is calculated locally, it may be done in a trusted environment, such as a TPM or other secure memory environment. In still other embodiments, the SPS may be calculated remotely from a user's device, e.g., by a service or services executing on a server, such as server 110 of FIG. 1. In yet other embodiments, parts of the SPS value calculation may be done locally, and other parts may be done remotely. In some embodiments, the various user SPS scores values over time may be stored in secure memory storage that is remote to the user's devices, such as database 111 of FIG. 1. In still other embodiments, SPS values may be stored (at least temporarily) locally on one or more of a user's devices and then periodically synchronized over time to a remote server that is serving as the SPS authority for the system.

As will be explained in further detail below, additional insights may be gained by monitoring and tracking a user's SPS score over time, e.g., using SPC techniques (508). SPC techniques may include, e.g., determining if one or more threshold values have been exceeded and/or determining whether one or more trend rules have been detected in monitored SPS data points over time. Additionally, in response to the use of the SPC techniques, one or more security alerts (510) may be provided to one or more of a user's devices, e.g., based on a particular threshold, rule, and/or trend that has been determined in the user's SPS score over time. Security alerts (510) may also prescribe one or more remedial actions the user can take to improve their SPS score.

In some embodiments, SPC techniques may be used to further augment the insights gained from the SPS value example given above (i.e., wherein the user's SPS covers an exemplary range from 0-1000, with the user being assigned a base score of 500 at the beginning of the process, and adjustments being made over time based on events that either positively or negatively impact the user's security situation). In particular, the user's SPS score value may be trended by date utilizing SPC, that is, looking for trends in the SPS value of a particular time interval. For example, when the user's SPS score increases over time (also referred to as an increase on the user's "trend line"), a desired set of SPC rules may be applied (e.g., the so-called "Western Electric Rules" may be used as a starting point for the SPC rules), which rules let the user know that anything increasing the value can be seen as a positive change, as well as which factor/event contributed to that score increase. Likewise, when a user's SPS score decreases and is observed on the trend line, the desired set of SPC rules may be applied, letting the user know whether the SPS score is within normal variability or not, and which factor/event contributed to that score decrease.

In this manner, the final SPS score is personalized, and the user can see the contributions causing the trend line to increase or decrease. The user does not have to be burdened with the knowledge of SPC or the particular set of SPC rules being applied. In some embodiments, a simple call-out for each detected variation may be provided, along with prescriptive direction, via easily-understood human language. The application of SPC may, in fact, alert the user to a minor issue (e.g., variation) that he may choose not to respond to, with the prescriptive direction stating something, such as: "Your Security Score has been reduced because of X. While it is not of an immediate nature, we recommend that you examine X and reboot your device to ensure your security is maintained at a high level." Alternately, more critical variations may be reported to the user with more urgent language, such as: "Your Security Score has been reduced because of Y and X. It is CRITICAL that you take immediate action to secure devices Y and X."

As mentioned above, users may be taken through the security-related information gathering process periodically to make sure the user's scores are always up-to-date across their multiple devices. According to some embodiments, the SPS authority may also indicate how the user's security score has evolved over time, e.g., so that the user can see if they have been taking positive steps to secure their online activities over time. Conversely, the user may also desire to be informed of changes to their SPS, e.g., if they have installed new programs, purchased new devices and/or changed their activities in such a way that has decreased their SPS score over time (potentially without their awareness). Similar to credit score reporting, the SPS reporting facility may provide guidance both on what has changed that affected the score, as well as provide suggestions on what the user could do to improve their SPS.

Figure 6:
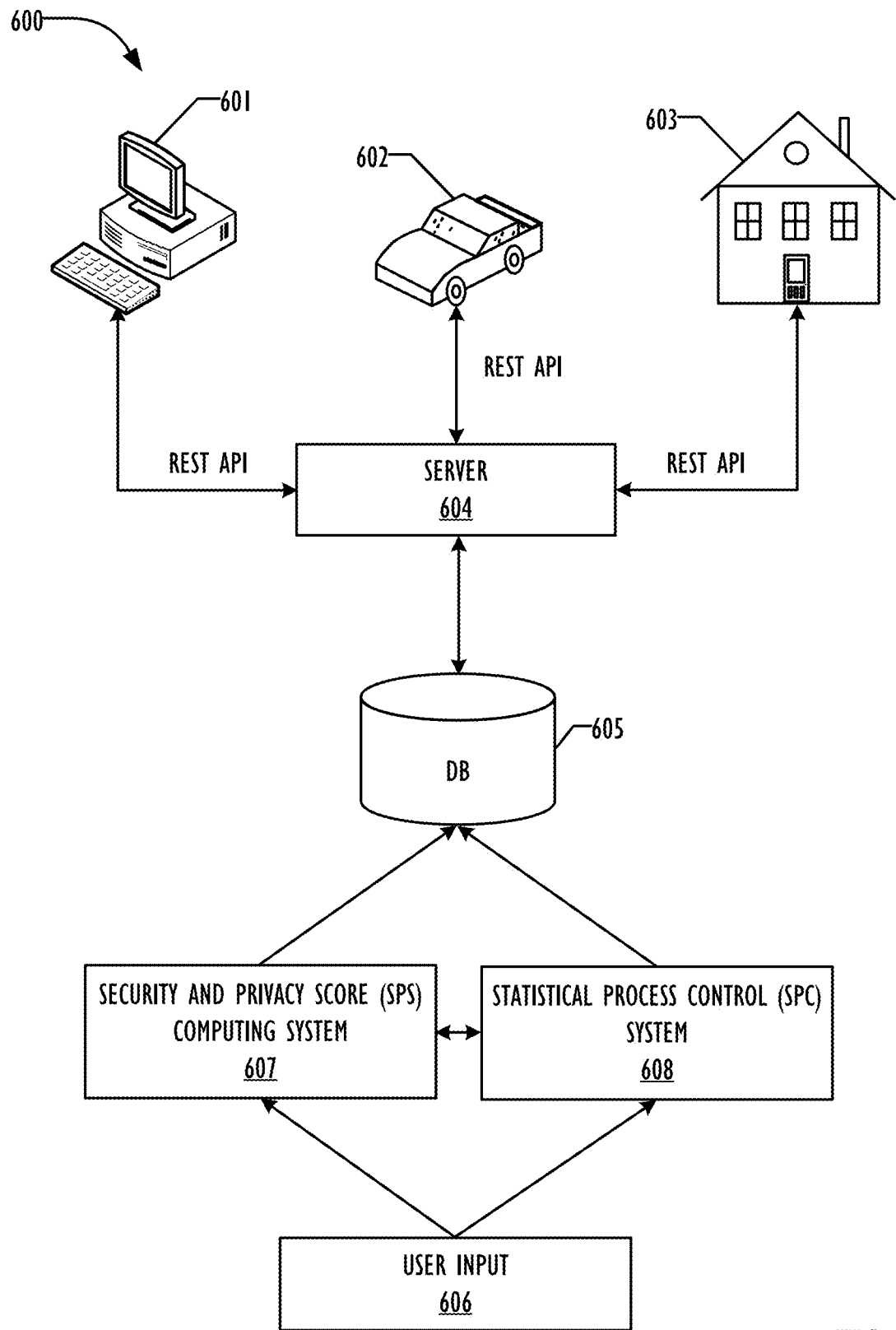
FIG. 6 is a block diagram illustrating an exemplary architecture for computing an improved multi-device security risk evaluation score leveraging SPC, according to one or more embodiments disclosed herein.

Turning now to FIG. 6, a block diagram showing an exemplary architecture 600 for computing an improved multi-device security risk evaluation score is illustrated, according to one or more embodiments disclosed herein. As discussed above with respect to FIG. 3, the user may input various information to the system about his or her various devices, applications, and activities/habits (606), which allows the SPS computing system (607) to compute an SPS value for the user, which, e.g., may be stored in a secure database (605). According to some embodiments of the improved multi-device security risk evaluation systems described herein, a user's SPS may be available for consumption by an authorized client via a Representational state transfer (i.e., REST or RESTful) API.

As also discussed above, according to some embodiments of the improved multi-device security risk evaluation systems described herein, a user's SPS value may also be evaluated over time by a Statistical Process Control (SPC) system (608). The SPC system can alert the user to potentially unnatural patterns in the value of the SPS score, possibly due to special causes that may warrant further attention or remedial action(s) to be performed by the user. The user may also input various new SPC rules, thresholds, and/or security alerts (and/or modifications to the existing SPC rules, thresholds, and/or security alerts) via user input 606, such that the SPC rules may be customized for a desired implementation.

The process of requesting a user's SPS may comprise the following steps, which are described in greater detail below. First, the system 607 may begin by assigning unique IDs to each user and product/device (e.g., devices 601-603) that wishes to register with (and/or use) the SPS values stored at the system 607. Next, when a device/product requests a user's SPS value, the system may check to determine that the user has previously authenticated the requesting device/product. It is to be understood that, in some cases, a user's own devices, e.g., devices 601-603 may make the SPS value request, but the request does not necessarily have to come from one of a user's own registered devices. For example, in the case of an enterprise environment, a system administrator may want (or need) to periodically check on the SPS values of the various devices under his or her administration. If the entity making a request for a user's SPS value has not previously been authenticated by the user, the user may be asked to explicitly grant permission to the requestor, i.e., as being authorized to make the SPS value request based on the user's one or more registered products and devices. Likewise, if the permission was previously granted, but has since expired, each requestor may be assigned a Time to Live (TTL), after which the permission expires. If the permissions of a particular device or product have expired, the user may have to re-authenticate the requestor. This process may also help the user to keep the number of products, other users and/or entities that are using his or her SPS information under control, i.e., so that sensitive user information is not distributed to more parties than is necessary or desired by the user. Finally, the system may provide an endpoint, e.g., RESTful Application Program Interface (API) endpoint (e.g., server 604) that can be used to request or transmit a user's SPS value from the server 607). The use of a RESTful API, i.e., an application program interface that uses Hypertext Transfer Protocol (HTTP) requests to GET, PUT, POST and DELETE data, may be preferred in some implementations, as it provides a lightweight, bandwidth-sensitive approach for implementing communications between clients and services via the Internet. In some embodiments, the requestor may send its assigned unique ID (e.g., an API key) and the unique ID of the user, e.g., using an HTTP GET request, to the RESTful API endpoint. If the user and product/device are properly authenticated, then the endpoint may respond with the user's current (and/or historical) SPS values, as well as any SPC rules or security alerts that may be relevant to the user's current SPS situation. In other embodiments, there may be other ways to deliver the SPS values and/or SPC information to requestors that do not necessarily involve RESTful API endpoints, e.g., via the use of a SOAP (Simple Object Access Protocol) request or other message transmission protocols.

According to some embodiments, if a user's SPS is low, it may mean that the user is generally vulnerable to information leakage or malware attacks. To counter this, a potentially-susceptible application may add an additional authentication step on top of the existing authentication system (e.g., implementing two-factor authentication). This could allow the application to provide appropriate personalized security for the user, based on the user's risk assessment, but without needing to know any details on what other devices the user owns or uses, or of the basis for the SPS. By contrast, if the user's SPS is already high, the user may be aware of the risks posed by a given application and may have taken appropriate actions to mitigate such security risks. In such situations, the application may keep the single-factor authentication, thus providing a simpler user experience, without materially compromising the user's security and privacy.

According to still other embodiments, the interconnectedness of a user's devices may be taken into account when determining the user's SPS. For example, assume that a user owns a connected car 602 that runs its own automobile-based operating system. Assume further that both the car and user are registered with an improved SPS scoring system 607, such as those described herein. If the user tries to create a profile on the car's operating system, the car may request that the improved SPS scoring system send the car the user's current SPS value. Upon receiving the user's SPS value from the system, the car may take the following actions: 1.) If the SPS is low, the car may automatically create a profile for the user that is more conservative in terms of what information it collects from the user and transmits to outside systems. This information could potentially include the locations the user travels to, the user's personalized settings in the car, the user's home and work address information, etc. Using the user's SPS value, the car could provide a safer user experience with better privacy settings for the user—rather than simply setting the automobile's operating system to operate with the factory default settings. 2.) If the user's SPS value is already fairly high, the car could create a profile for the user that allows more data exchange between the car and outside systems, based on the understanding that the user is generally aware of and protects his or her data across the multiple devices of his or her digital ecosystem. This allows the car to provide a more personalized experience for the user—without requiring detailed knowledge of the user's activities and settings on his or her other connected devices, or even knowledge of those other connected devices.

Referring now to FIG. 7, tables of exemplary Statistical Process Control (SPC) thresholds and probabilities are shown, according to one or more embodiments disclosed herein. Table 700 details the various probabilities and zones used in tests for unnatural patterns in measured control data, as established by Western Electric Company in 1956. In applying these probabilities, three characteristics of a natural pattern emerge: 1) most points are near the centerline (i.e., the sample average, or "x-bar," as referred to in table 700); 2) a few points are near the control limits (i.e., defined by the extent of Zone A); and 3) no points (or only a rare point) are beyond the control limits (i.e., lie outside of Zone A, in either the positive or negative direction from the centerline). Unnatural patterns, or those caused by special causes, typically involve the absence of one of these characteristics.

The so-called "Western Electric Rules" utilize these probabilities to test for instability of a process and to determine whether the system is changing or not, as shown in table 710. For example, the probability that a single point occurs outside the 3-sigma limit (i.e., beyond the extent of Zone A) is 0.0013. However, even when points remain within the 1-sigma limit (i.e., within the extent of Zone C), they still may be indicative of an unstable system. For example, the probability that eight consecutive measurement points in a row occur inside the 1-sigma limit (i.e., within the extent of Zone C), but all to one side of the centerline, is just 0.0039. If any of the monitored statistical thresholds are violated, the system may issue a security alert to the user and/or suggest remedial action to bring the user's SPS score value back within acceptable limits of statistical variation.

Referring now to FIG. 8, a table 800 illustrating exemplary SPC rules and the corresponding exemplary security alerts is shown, according to one or more embodiments disclosed herein. Table 800 represents eight exemplary SPC rules that may be employed by a control system, with an additional column entitled, "Security Alert," listing an exemplary prescription and/or message that may be used to alert a user that a given rule has been violated. (Note: in some systems, the Rules may have different numbers, but the point locations and detection thresholds may remain the same.)

In some embodiments, the exemplary Security Alerts in table 800 may be specifically tailored to the SPS value scenarios described herein. For example, different alerts and/or actions may be prescribed depending on whether the SPS value is abnormally high (versus abnormally low). In a normal industrial scenario, abnormally high or abnormally low scores may be equally distressing, but, in the context of security scores, only an abnormally low score (i.e., a very insecure environment) may require further action or input from the user. Likewise, because a user's personal and/or sensitive information may be at risk, a sense of urgency and criticality may be conveyed to the user via the chosen security alert messaging, so that the necessary remedial actions may hopefully be undertaken before any of the user's information has been unknowingly or unwittingly compromised from one or more devices. It is to be understood that the rules shown in table 800 are merely exemplary, and that different or modified rules may be used for a given implementation, if so desired. Further, the corresponding security alerts for each rule may also be tailored to a given implementation, such that the desired sense of urgency and criticality is conveyed to a user.

EXAMPLES

The following examples pertain to further embodiments.

Example 1 is a computer system configured for producing security scores, comprising: a memory; and one or more processors communicatively coupled to the memory wherein, the memory comprises instructions stored therein to cause the one or more processors to perform a computer implemented method, the method comprising: registering a first user with the computer system; registering one or more devices associated with the first user with the computer system; collecting information from the first user, wherein the collected information comprises information regarding: the one or more devices associated with the first user;

applications used by the first user on the one or more devices; activities performed by the first user on the one or more devices; and interactions between the one or more devices associated with the first user; computing an overall security score for the first user based, at least in part, on the collected information; and reporting the computed overall security score to at least one of the one or more devices.

Example 2 comprises the subject matter of Example 1, wherein registering the first user with the computer system further comprises assigning a first unique identifier to the first user.

Example 3 comprises the subject matter of Example 1, wherein registering the one or more devices associated with the first user with the computer system further comprises assigning a unique identifier to each of the one or more devices associated with the first user.

Example 4 comprises the subject matter of Example 1, wherein the method further comprises authenticating the first user and at least one of the one or more devices, and wherein reporting the computed overall security score to at least one of the one or more devices further comprises reporting the computed overall security score to one or more of the authenticated one or more devices.

Example 5 comprises the subject matter of Example 1, wherein the act of computing an overall security score for the first user is repeated: at a regular time interval; at an irregular time interval; or in response to one or more trigger events.

Example 6 comprises the subject matter of Example 1, wherein the method further comprises applying one or more Statistical Process Control (SPC) rules to one or more overall security scores computed for the first user.

Example 7 comprises the subject matter of Example 6, wherein the method further comprises reporting one or more security alerts to at least one of the one or more devices, wherein a content of the security alert is based, at least in part, on the application of the one or more SPC rules.

Example 8 comprises the subject matter of Example 1, wherein the method further comprises decreasing the overall security score for the first user responsive to collected information that indicates a lesser level of security for the first user and increasing the overall security score for the first user responsive to collected information that indicates a greater level of security for the first user.

Example 9 comprises the subject matter of Example 8, wherein a degree to which the overall security score for the first user increases or decreases corresponds to a degree to which the collected information indicates an overall greater level of security or lesser level of security, respectively, for the first user.

Example 10 comprises the subject matter of Example 1, wherein at least one of the one or more devices comprises one of the following: an automobile, a home, a home appliance, a smart device, or a wearable device.

Example 11 is a computer-implemented method for producing security scores, comprising: registering a first user with a computer system; registering one or more devices associated with the first user with the computer system; collecting information from the first user, wherein the collected information comprises information regarding: the one or more devices associated with the first user; applications used by the first user on the one or more devices; activities performed by the first user on the one or more devices; and interactions between the one or more devices associated with the first user; computing an overall security score for the first user based, at least in part, on the collected information; and reporting the computed overall security score to at least one of the one or more devices.

Example 12 comprises the subject matter of Example 11, wherein the method further comprises applying one or more Statistical Process Control (SPC) rules to one or more overall security scores computed for the first user.

Example 13 comprises the subject matter of Example 12, wherein the method further comprises reporting one or more security alerts to at least one of the one or more devices, wherein a content of the security alert is based, at least in part, on the application of the one or more SPC rules.

Example 14 comprises the subject matter of Example 11, wherein the method further comprises authenticating the first user and at least one of the one or more devices, and wherein reporting the computed overall security score to at least one of the one or more devices further comprises reporting the computed overall security score to one or more of the authenticated one or more devices.

Example 15 comprises the subject matter of Example 11, wherein the act of computing an overall security score for the first user is repeated: at a regular time interval; at an irregular time interval; or in response to one or more trigger events.

Example 16 is a non-transitory computer readable medium storing a program for producing security scores, comprising computer executable instructions stored thereon to cause one or more processing units to: register a first user with a computer system; register one or more devices associated with the first user with the computer system; collect information from the first user, wherein the collected information comprises information regarding: the one or more devices associated with the first user; applications used by the first user on the one or more devices; activities performed by the first user on the one or more devices; and interactions between the one or more devices associated with the first user; compute an overall security score for the first user based, at least in part, on the collected information; and report the computed overall security score to at least one of the one or more devices.

Example 17 comprises the subject matter of Example 16, wherein the instructions further cause the one or more processing units to apply one or more Statistical Process Control (SPC) rules to one or more overall security scores computed for the first user.

Example 18 comprises the subject matter of Example 17, wherein the instructions further cause the one or more processing units to report one or more security alerts to at least one of the one or more devices, wherein a content of the security alert is based, at least in part, on the application of the one or more SPC rules.

Example 19 comprises the subject matter of Example 18, wherein the instructions further cause the one or more processing units to authenticate the first user and at least one of the one or more devices, and wherein the instructions to report the computed overall security score to at least one of the one or more devices further comprise instructions to report the computed overall security score to one or more of the one or more authenticated devices.

Example 20 comprises the subject matter of Example 16, wherein the instructions to compute an overall security score for the first user are repeatedly executed: at a regular time interval; at an irregular time interval; or in response to one or more trigger events.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

The above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A computer-implemented method for producing a security score, the method comprising:
   registering a first user with a computer system;
   registering one or more devices associated with the first user with the computer system;
   collecting information from the first user, wherein the collected information identifies:
      the one or more devices associated with the first user;
      applications used by the first user on the one or more devices; and
      activities performed by the first user on the one or more devices;
   determining respective security sub-scores for respective items of the one or more devices, the applications used by the first user, and the activities performed by the first user;
   computing an overall security score for the first user based, at least in part, on an aggregation of the respective security sub-scores; and
   creating a user profile based on the overall security score, the user profile to enable the at least one of the one or more devices to exchange data with an external device when the overall security score meets a security score threshold, the user profile to prevent the at least one of the one or more devices from exchanging data with the external device when the overall security score does not meet the security score threshold.

2. The computer-implemented method of claim 1, further including applying one or more Statistical Process Control (SPC) rules to one or more overall security scores computed for the first user.

3. The computer-implemented method of claim 2, further including reporting one or more security alerts to at least one of the one or more devices, wherein a content of the security alert is based, at least in part, on the application of the one or more SPC rules.

4. The computer-implemented method of claim 1, further including:
   authenticating the first user and at least one of the one or more devices; and
   reporting the computed overall security score to one or more of the one or more authenticated devices.

5. The computer-implemented method of claim 1, wherein the computing of the overall security score for the first user is repeated at least one of:
   at a regular time interval;
   at an irregular time interval; or
   in response to one or more trigger events.

6. A non-transitory computer readable medium storing a program for producing security scores, comprising computer executable instructions to cause one or more processing units to, at least:
   register a first user with a computer system;
   register one or more devices associated with the first user with the computer system;
   collect information from the first user, wherein the collected information includes information regarding:
      the one or more devices associated with the first user;
      applications used by the first user on the one or more devices; and
      activities performed by the first user on the one or more devices;
   determine respective security sub-scores for respective items of the one or more devices, the applications used by the first user, and the activities performed by the first user;
   compute an overall security score for the first user based, at least in part, on an aggregation of the respective security sub-scores; and
   cause at least one of the one or more devices to create a user profile based on the overall security score, the user profile to enable the one or more processing units to exchange data with an external device when the overall security score meets a security score threshold, the user profile to prevent the one or more processing units from exchanging data with the external device when the overall security score does not meet the security score threshold.

7. The non-transitory computer readable medium of claim 6, wherein the instructions when executed, cause the one or more processing units to apply one or more Statistical Process Control (SPC) rules to one or more overall security scores computed for the first user.

8. The non-transitory computer readable medium of claim 7, wherein the instructions, when executed, cause the one or more processing units to report one or more security alerts to at least one of the one or more devices, wherein a content of the security alert is based, at least in part, on the application of the one or more SPC rules.

9. The non-transitory computer readable medium of claim 8, wherein the instructions, when executed, cause the one or more processing units to:
authenticate the first user and at least one of the one or more devices; and
report the computed overall security score to one or more of the one or more authenticated devices.

10. The non-transitory computer readable medium of claim 6, wherein the instructions to compute the overall security score for the first user are executed at least one of:
at a regular time interval;
at an irregular time interval; or
in response to one or more trigger events.

11. A computer system to produce security scores, the system comprising:
memory; and
one or more processors, the memory including instructions that, when executed, cause the one or more processors to at least:
register a first user with the computer system;
register one or more devices associated with the first user with the computer system;
collect information from the first user, the collected information to identify:
the one or more devices associated with the first user;
applications used by the first user on the one or more devices; and
activities performed by the first user on the one or more devices;
determine respective security sub-scores for respective ones of the one or more devices, the applications used by the first user, and the activities performed by the first user;
compute an overall security score for the first user based, at least in part, on an aggregation of the respective security sub-scores; and
cause at least one of the one or more devices to create a user profile based on the overall security score, the user profile to enable the at least one of the one or more devices to exchange data with an external device when the overall security score meets a security score threshold, the user profile to prevent the at least one of the one or more devices from exchanging data with the external device when the overall security score does not meet the security score threshold.

12. The computer system of claim 11, wherein the one or more processors are to assign a first unique identifier to the first user.

13. The computer system of claim 11, wherein the one or more processors are to assign a unique identifier to the respective ones of the one or more devices associated with the first user.

14. The computer system of claim 11, wherein the one or more processors are to:
authenticate the first user and at least one of the one or more devices; and
report the computed overall security score to one or more of the one or more authenticated devices.

15. The computer system of claim 11, wherein the one or more processors are to compute the overall security score for the first user in response to at least one of a regular time interval, an irregular time interval, or in response to one or more trigger events.

16. The computer system of claim 11, wherein the one or more processors are to apply one or more Statistical Process Control (SPC) rules to one or more overall security scores computed for the first user.

17. The computer system of claim 16, wherein the one or more processors are to report one or more security alerts to at least one of the one or more devices, wherein a content of the security alert is based, at least in part, on the application of the one or more SPC rules.

18. The computer system of claim 11, wherein the one or more processors are to:
decrease the overall security score for the first user responsive to collected information that indicates a lesser level of security for the first user; and
increase the overall security score for the first user responsive to collected information that indicates a greater level of security for the first user.

19. The computer system of claim 18, wherein a first degree to which the overall security score for the first user is to increase or decrease corresponds to a second degree to which the collected information indicates an overall greater level of security or lesser level of security, respectively, for the first user.

20. The computer system of claim 11, wherein at least one of the one or more devices includes at least one of an automobile, a home, a home appliance, a smart device, or a wearable device.

* * * * *